United States Patent
Stuart et al.

(10) Patent No.: US 8,727,269 B2
(45) Date of Patent: May 20, 2014

(54) SYSTEM AND METHOD FOR MOUNTING AN AIRCRAFT ENGINE

(75) Inventors: Alan Roy Stuart, Cincinnati, OH (US); John Robert Fehrmann, Loveland, OH (US)

(73) Assignee: General Electric Company, Schenectady, NY (US)

( * ) Notice: Subject to any disclaimer, the term of this patent is extended or adjusted under 35 U.S.C. 154(b) by 334 days.

(21) Appl. No.: 13/487,666

(22) Filed: Jun. 4, 2012

(65) Prior Publication Data

US 2012/0305700 A1    Dec. 6, 2012

Related U.S. Application Data

(60) Provisional application No. 61/493,709, filed on Jun. 6, 2011.

(51) Int. Cl.
*B64D 27/00*    (2006.01)

(52) U.S. Cl.
USPC ............... 244/54; 244/53 R; 60/797; 248/554

(58) Field of Classification Search
USPC ............... 244/54, 53 R; 60/796, 797, 39.091; 248/554, 557
See application file for complete search history.

(56) References Cited

U.S. PATENT DOCUMENTS

| | | | |
|---|---|---|---|
| 4,437,627 A | | 3/1984 | Moorehead |
| 4,854,525 A | * | 8/1989 | Chee ............................... 244/54 |
| 5,064,144 A | * | 11/1991 | Chee ............................... 244/54 |
| 5,174,525 A | * | 12/1992 | Schilling ......................... 244/54 |
| 5,319,922 A | * | 6/1994 | Brantley ......................... 60/797 |
| 5,385,013 A | * | 1/1995 | Barron et al. ................... 60/782 |
| 5,524,847 A | * | 6/1996 | Brodell et al. .................. 244/54 |
| 5,746,391 A | | 5/1998 | Rodgers |
| 6,330,985 B1 | | 12/2001 | Manteiga |

(Continued)

FOREIGN PATENT DOCUMENTS

EP    2202153 A2    6/2010

OTHER PUBLICATIONS

Search Report and Written Opinion from corresponding International Application No. PCT/US2012/040886, dated Oct. 25, 2012.

*Primary Examiner* — Christopher P Ellis
*Assistant Examiner* — Medhat Badawi
(74) *Attorney, Agent, or Firm* — William Scott Andes; Gary M. Hartman; Domenica N. S. Hartman

(57) ABSTRACT

A mounting system and method capable of reducing backbone deflection in a high-bypass turbofan engine. The system includes a rigid structure and a linkage mechanism having at least first and second links that are each pivotally connected to the rigid structure and adapted to be pivotally connected to an engine support structure of the aircraft. The first and second links are configured to define a focal point thereof at a location that is a distance from a centerline of the engine of not more than 15% of an inlet diameter at an inlet of the engine, and is located aft of a vector of an inlet load to which the engine is subjected when the aircraft is in a climb maneuver. The location of the focal point is such that a moment of a thrust load of the engine and a moment of the inlet load oppose each other, thereby reducing backbone bending of the engine during the climb maneuver.

20 Claims, 17 Drawing Sheets

(56) References Cited

U.S. PATENT DOCUMENTS

| | | | |
|---|---|---|---|
| 6,843,449 B1* | 1/2005 | Manteiga et al. | 244/54 |
| 8,479,491 B2* | 7/2013 | Stuart et al. | 60/226.2 |
| 2008/0010969 A1* | 1/2008 | Hauer et al. | 60/204 |
| 2008/0073460 A1 | 3/2008 | Beardsley | |
| 2008/0197233 A1* | 8/2008 | Combes et al. | 244/54 |
| 2008/0224018 A1* | 9/2008 | Lafont et al. | 248/554 |
| 2008/0245926 A1* | 10/2008 | Journade et al. | 244/54 |
| 2008/0251633 A1* | 10/2008 | Journade et al. | 244/54 |
| 2009/0212155 A1* | 8/2009 | Huggins et al. | 244/54 |
| 2009/0266932 A1* | 10/2009 | Roche et al. | 244/54 |
| 2009/0283631 A1* | 11/2009 | Roche | 244/54 |
| 2010/0090056 A1* | 4/2010 | Gardes et al. | 244/54 |
| 2010/0116926 A1* | 5/2010 | Combes et al. | 244/54 |
| 2010/0127118 A1* | 5/2010 | Combes et al. | 244/54 |
| 2010/0147996 A1 | 6/2010 | Hartshorn | |
| 2011/0023450 A1* | 2/2011 | Stuart et al. | 60/226.2 |
| 2011/0127369 A1* | 6/2011 | Dussol et al. | 244/54 |
| 2011/0127371 A1* | 6/2011 | Takeuchi | 244/54 |
| 2012/0079805 A1* | 4/2012 | Stuart et al. | 60/226.2 |
| 2012/0304621 A1* | 12/2012 | Stuart et al. | 60/226.2 |

* cited by examiner

SYSTEM AND METHOD FOR MOUNTING AN AIRCRAFT ENGINE

CROSS REFERENCE TO RELATED APPLICATIONS

This application claims the benefit of U.S. Provisional Application No. 61/493,709, filed Jun. 6, 2011, the contents of which are incorporated herein by reference.

BACKGROUND OF THE INVENTION

The present invention generally relates to systems and methods for mounting an aircraft engine to an aircraft. More particularly, this invention relates to a mounting system and method adapted to reduce backbone deflection that can occur in an aircraft engine as a result of aerodynamic and thrust loads during aircraft operation.

FIG. 1 schematically represents a high-bypass turbofan engine 10 of a type known in the art. The engine 10 is schematically represented as including a nacelle 12 and a core engine (module) 14. A fan assembly 16 located in front of the core engine 14 includes a spinner nose 20 projecting forwardly from an array of fan blades 18. The core engine 14 is schematically represented as including a high-pressure compressor 22, a combustor 24, a high-pressure turbine 26 and a low-pressure turbine 28. A large portion of the air that enters the fan assembly 16 is bypassed to the rear of the engine 10 to generate additional engine thrust. The bypassed air passes through an annular-shaped bypass duct 30 between the nacelle 12 and an inner core cowl 36, and exits the duct 30 through a fan exit nozzle 32. The core cowl 36 defines the radially inward boundary of the bypass duct 30, and provides an aft core cowl transition surface to a primary exhaust nozzle 38 that extends aftward from the core engine 14. The nacelle 12 defines the radially outward boundary of the bypass duct 30, and the bypassed fan air flows between bypass duct flow surfaces defined by the nacelle 12 and core cowl 36 before being exhausted through the fan exit nozzle 32.

The nacelle 12 is typically composed of three primary elements that define the external boundaries of the nacelle 12: an inlet assembly 12A located upstream of the fan assembly 16, a fan cowl 12B interfacing with an engine fan case 42 that surrounds the fan blades 18, and a thrust reverser assembly 12C located aft of the fan cowl 12B. The thrust reverser assembly 12C comprises three primary components: a translating cowl 34A mounted to the nacelle 12, a cascade 34B schematically represented within the nacelle 12, and blocker doors 34C adapted to be pivotally deployed from stowed positions shown in FIG. 1 as radially inward from the cascade 34B. The fore end of each blocker door 34C is pivoted into engagement with the inner core cowl 36 when the door 34C is fully deployed, and as such the inner core cowl 36 of the core engine 14 is also part of the thrust reverser assembly 12C.

When installed on an aircraft, the engine 10 is supported by an aircraft structure, for example, a pylon (not shown) that extends outward from the aircraft. In the case of an engine mounted to a wing, the pylon typically extends downwardly beneath the wing. Structural components of the pylon are connected to a frame of the core engine 12 that supports the rotating components of the compressor 22 and turbines 26 and 28. The engine frame typically includes a forward frame adjacent the compressor 22, an aft frame adjacent the turbines 26 and 28, and an engine casing that connects the forward and aft frames. The engine casing is often referred to as the backbone of the engine 10. Aircraft engines of the type represented in FIG. 1 are typically mounted and secured to an aircraft in two planes normal to the engine centerline 40. One mount is typically connected to the forward frame often just rearward of the fan assembly 16, and a second mount is typically connected to the aft frame near the turbine section.

During climb and certain aircraft maneuvers, the centerline 40 of the engine 10 is pitched relative to the direction of approaching airflow, with the result that the nacelle 12 can be subjected to upward aerodynamic loading. This aerodynamically-induced load, often referred to as the inlet load and represented by the vector $F_i$ in FIG. 1, is in addition to the thrust load, represented by the vector $F_t$ in FIG. 1. These loads induce bending moments in the engine casing (backbone), with the result that the backbone is deflected (bends) from its concentric position about the engine centerline 40. Maintaining concentricity of the engine backbone about the centerline 40 is important from the standpoint of minimizing blade tip clearances within the compressor 22 and turbine sections 26 and 28 of the engine 10, which has the beneficial effect of improving engine specific fuel consumption (SFC) and fuel burn. In addition, reduced backbone bending reduces the incidence of blade tip rub encounters with the surrounding engine structures (including the fan case 42), which promotes in-service performance retention. Engines with a longer interval for time on-wing to removal for service provide reduced service contract costs to their operators.

Approaches for reducing backbone deflection in high-bypass turbofan engines have included reinforcement of the engine frame. However, such approaches typically increase weight and cost and may not be entirely effective, particularly as inlet and thrust loads increase with larger nacelles and higher thrusts. Other approaches have included orienting the forward mount plane to move its focal point toward the engine centerline and forward toward the inlet load vector ($F_i$). However, this approach has not entirely eliminated backbone bending especially in flight regimes where maximum inlet loads are encountered, such as when an aircraft rotates during take-off. Consequently, there is an ongoing need for approaches capable of reducing backbone deflection in high-bypass turbofan engines.

BRIEF DESCRIPTION OF THE INVENTION

The present invention provides a mounting system and method capable of reducing backbone deflection in a turbomachine, a notable example being a high-bypass turbofan engine for an aircraft.

According to a first aspect of the invention, a system for mounting an engine to a support structure of an aircraft includes a rigid structure and a linkage mechanism having at least first and second links that are each pivotally connected to the rigid structure and adapted to be pivotally connected to the support structure of the engine. The first and second links are configured to define a focal point thereof at a location that is a distance from a centerline of the engine of not more than 15% of an inlet diameter at an inlet of the engine, and is located aft of a vector of an inlet load to which the engine is subjected when the aircraft is in a climb maneuver. The location of the focal point is such that a moment of a thrust load of the engine and a moment of the inlet load oppose each other, thereby reducing backbone bending of the engine during the climb maneuver.

According to a second aspect of the invention, a method of mounting an engine to a support structure of an aircraft utilizes a system comprising a rigid structure and a linkage mechanism having at least first and second links that are each pivotally connected to the rigid structure and adapted to be pivotally connected to the support structure of the engine. The method includes coupling the system to the engine and to the support structure of the aircraft so that the first and second links are pivotally connected to the rigid structure, the first link is pivotally connected to the support structure of the aircraft, the second link is pivotally connected to the engine, and the first and second links to define a focal point thereof at a location below a centerline of the engine and aft of a vector of an inlet load to which the engine is subjected when the aircraft is in a climb maneuver. The location of the focal point causes a moment of a thrust load of the engine and a moment of the inlet load to oppose each other, thereby reducing backbone bending of the engine during the climb maneuver.

A technical effect of the invention is ability locate the focal point of the mounting system at or near to a location relative to the inlet loading and engine centerline that can potential reduce backbone bending to negligible levels, even in large turbofan engines that generate high thrust levels. Furthermore, the mounting system is capable of achieving this benefit while avoiding a substantial penalty in cost or weight typically associated with prior efforts to reduce backbone bending.

Other aspects and advantages of this invention will be better appreciated from the following detailed description.

DETAILED DESCRIPTION OF THE INVENTION

Figure 1:
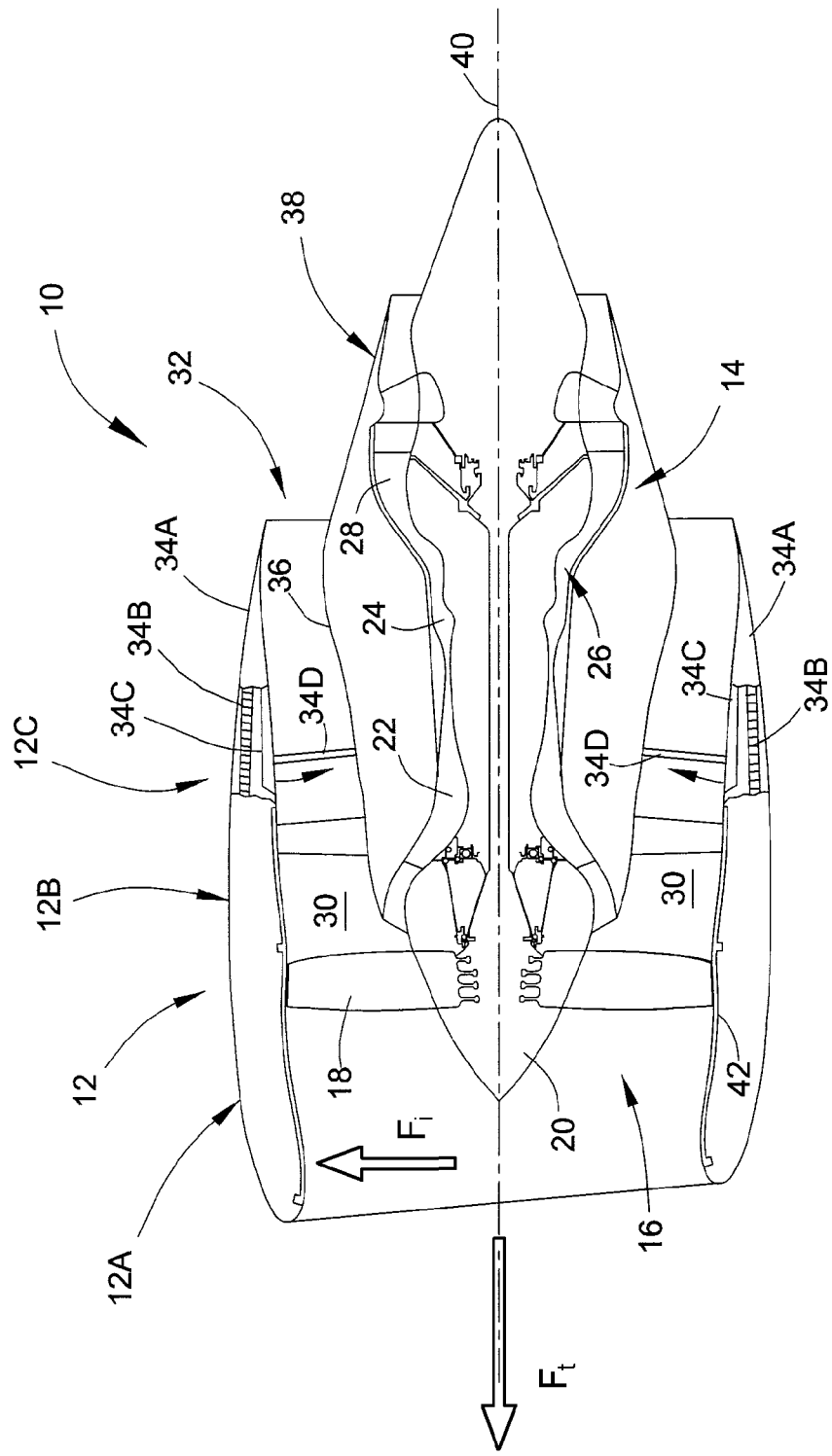
FIG. 1 schematically represents a cross-sectional view of a high-bypass turbofan engine.

FIGS. 2 through 17 represent various views of a system 50 for mounting a gas turbine engine to an aircraft. The mounting system 50 can be installed in a high-bypass gas turbofan engine of the type represented in FIG. 1 and therefore, as a matter of convenience, the same numbers used in FIG. 1 to identify the engine 10 and its components will be used in FIGS. 2 through 17 to identify the same or functionally equivalent components. To facilitate the description of the system 50 provided below, the terms "vertical," "horizontal," "lateral," "forward," "aft," "upper," "lower," "above," "below," etc., may be used in reference to the perspective of the installation and orientation of the engine 10 on an aircraft, and therefore are relative terms that indicate the construction, installation and use of the invention and help to define the scope of the invention. However, it is within the scope of the invention that the system 50 could be installed on an engine that markedly differs from the engine 10 shown in the drawings, or installed at other points of an aircraft, for example, the fuselage. Finally, it is foreseeable that the system 50 could find uses in applications other than aircraft engines.

Figure 2:
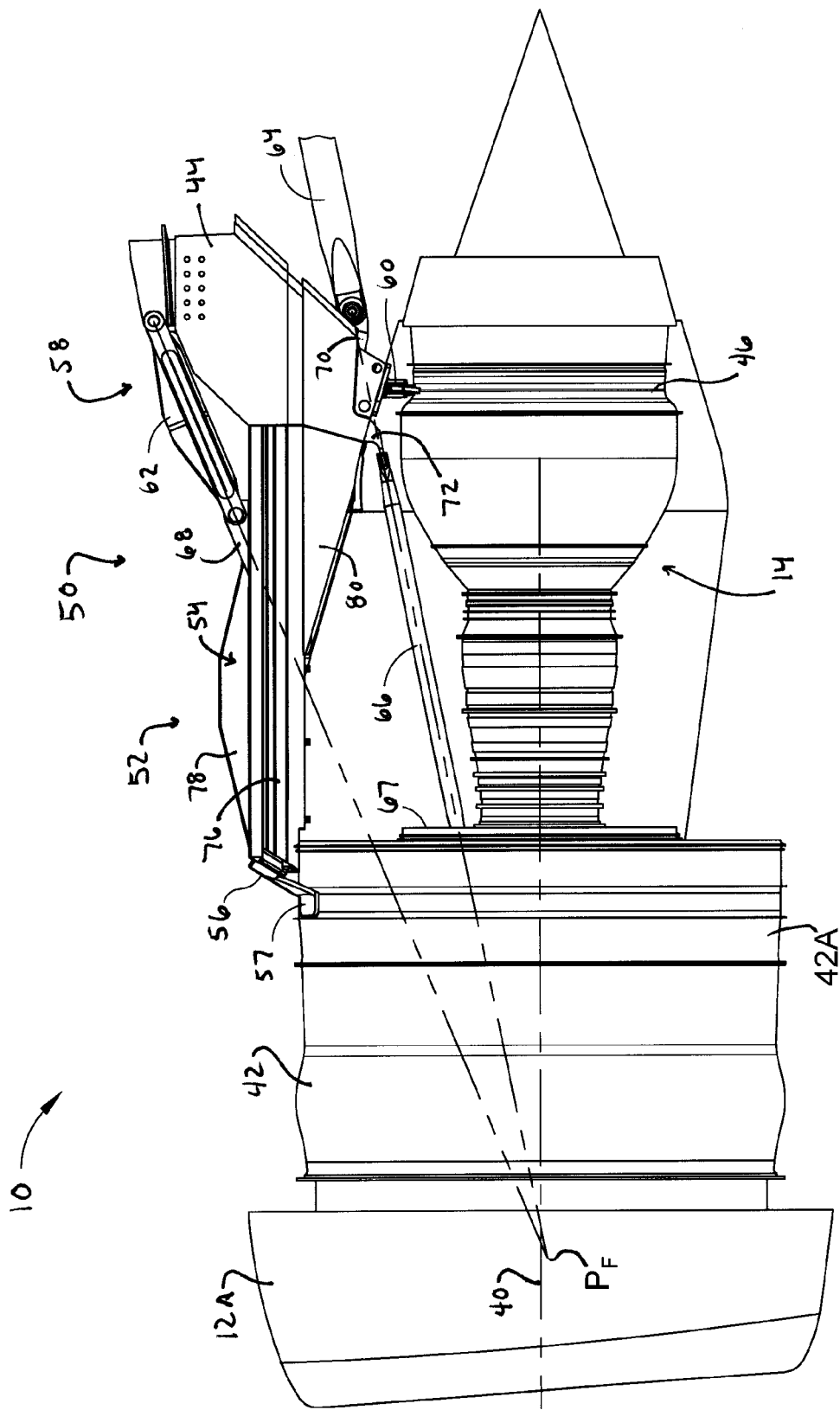
FIG. 2 is a side view of a high-bypass turbofan engine equipped with a system for mounting the engine to an aircraft wing support structure according to an embodiment of the invention.

As evident from FIG. 2, the mounting system 10 is generally configured as a pylon that is installed on the engine 10, which is represented with portions of its nacelle 12 removed to expose the fan case 42 and its aft fan case 42A. The system 50 includes a forward section 52 that, in the embodiment shown in the Figures, comprises a fully integrated structure 54 and a forward engine mount 56 structurally coupled to the fan case 42 of the engine 10. The forward engine mount 56 includes one or more joints 57 that may comprise, as an example, spherical joints. In this example, two joints 57 are shown, though the use of additional joints is also within the scope of the invention.

The system 50 further has an aft section 58 whose components include an aft engine mount 60 adapted to be directly coupled to a support structure 44 associated with an aircraft wing (not shown). The aft engine mount 60 is considered herein to be a component of the mounting system 50, but is not directly coupled to any other component of the system 50 (FIG. 7). Instead, the aft engine mount 60 preferably directly couples an aft support frame 46 of the core engine 14 to the aircraft wing support structure 44, for example, in the manner shown in FIG. 2. As with the forward engine mount 56, the aft engine mount 60 can comprise one or more spherical joints (as more readily apparent from FIGS. 5 and 17). The aft section 58 further includes members of what may be described as a four-bar type linkage mechanism that connects the engine 10 to the aircraft wing support structure 44. This linkage mechanism includes one or more upper links 62, at least one lower link 64, and one or more thrust links 66, all of which are connected through the integrated structure 54. Each upper link 62 is pivotally coupled to a bar member 68 that extends aftward from and is rigidly attached to the structure 54 of the forward section 52. The lower link 64 is pivotally coupled to a bar member 70 that extends aftward from a lower section 72 of the system 50 that is also rigidly attached to the structure 54 of the forward section 52. As more readily evident from FIG. 5, the forward ends of the thrust links 66 are pivotally connected to a forward flange station 67 of the high pressure compressor 22 near the forward end of the core engine 14, whereas FIGS. 2 through 7 represent the aft ends of the thrust links 66 as pivotally coupled to the lower section 72 of the system 50. According to a preferred aspect of the invention, the integrated structure 54 provides a substantially rigid connection between the links 62, 64 and 66.

Figure 3:
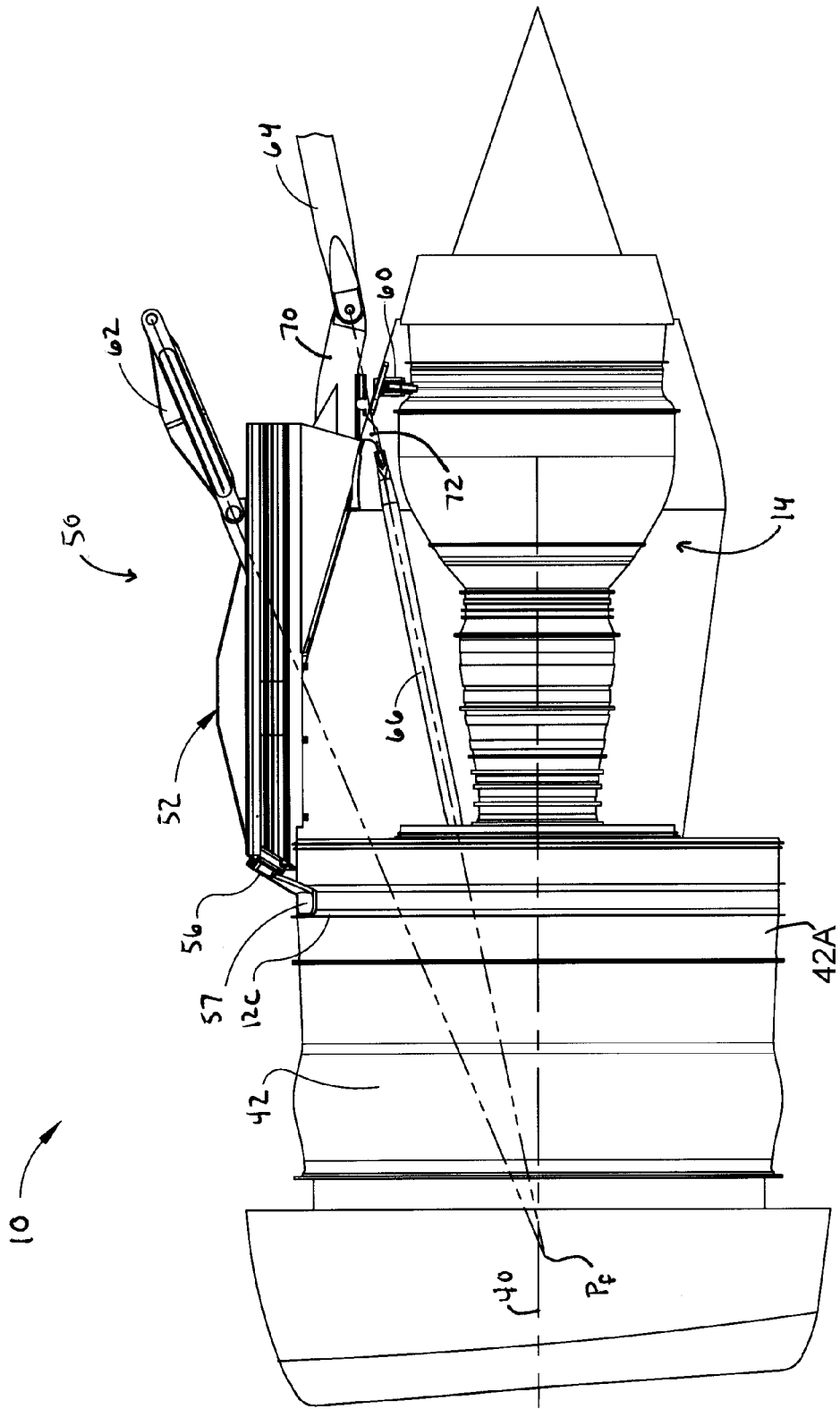
FIGS. 3, 4 and 5 are side, top and perspective views, respectively, of the engine and mounting system of FIG. 2 isolated from the aircraft wing support structure.
Figure 4:
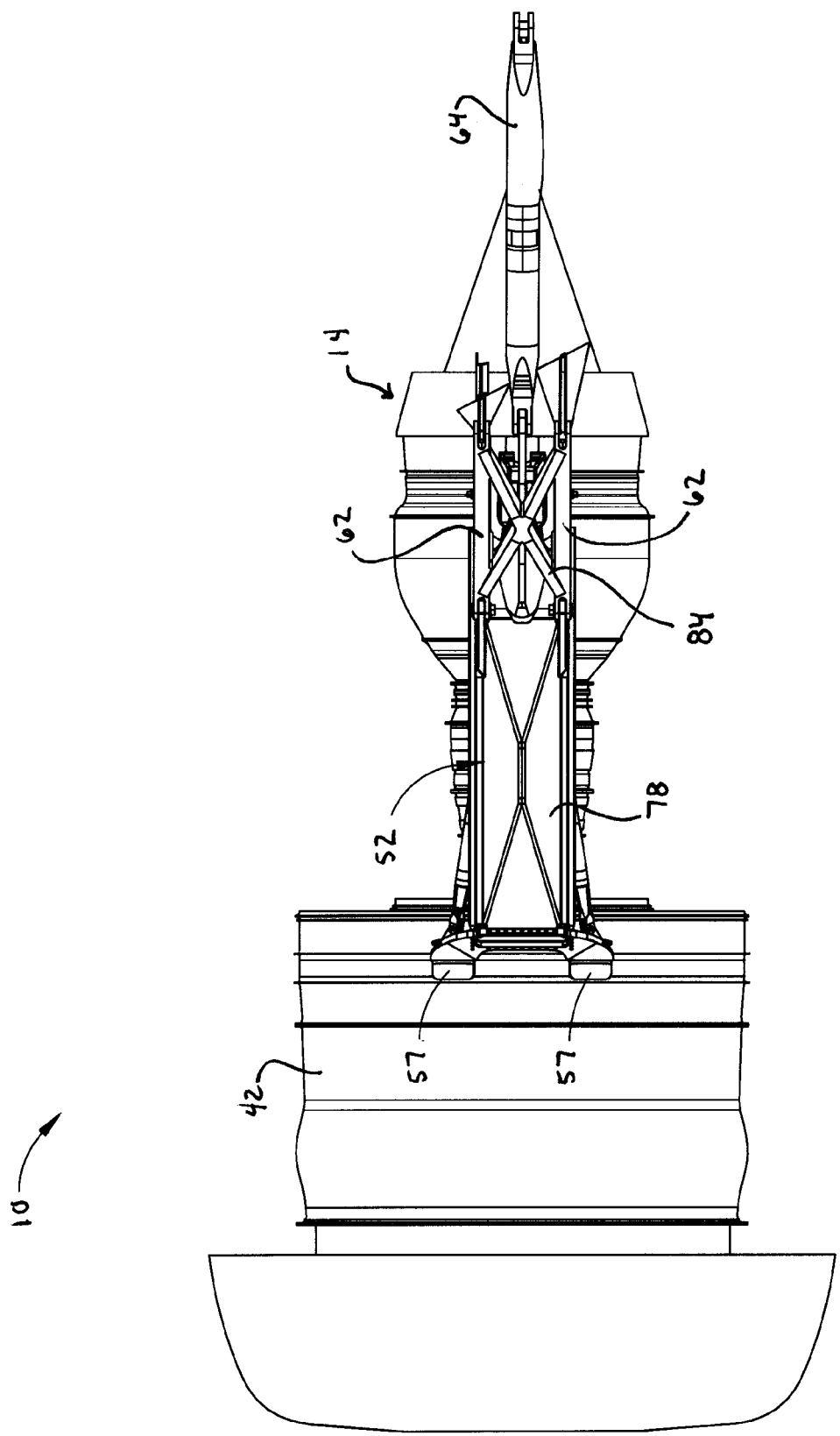
Figure 5:
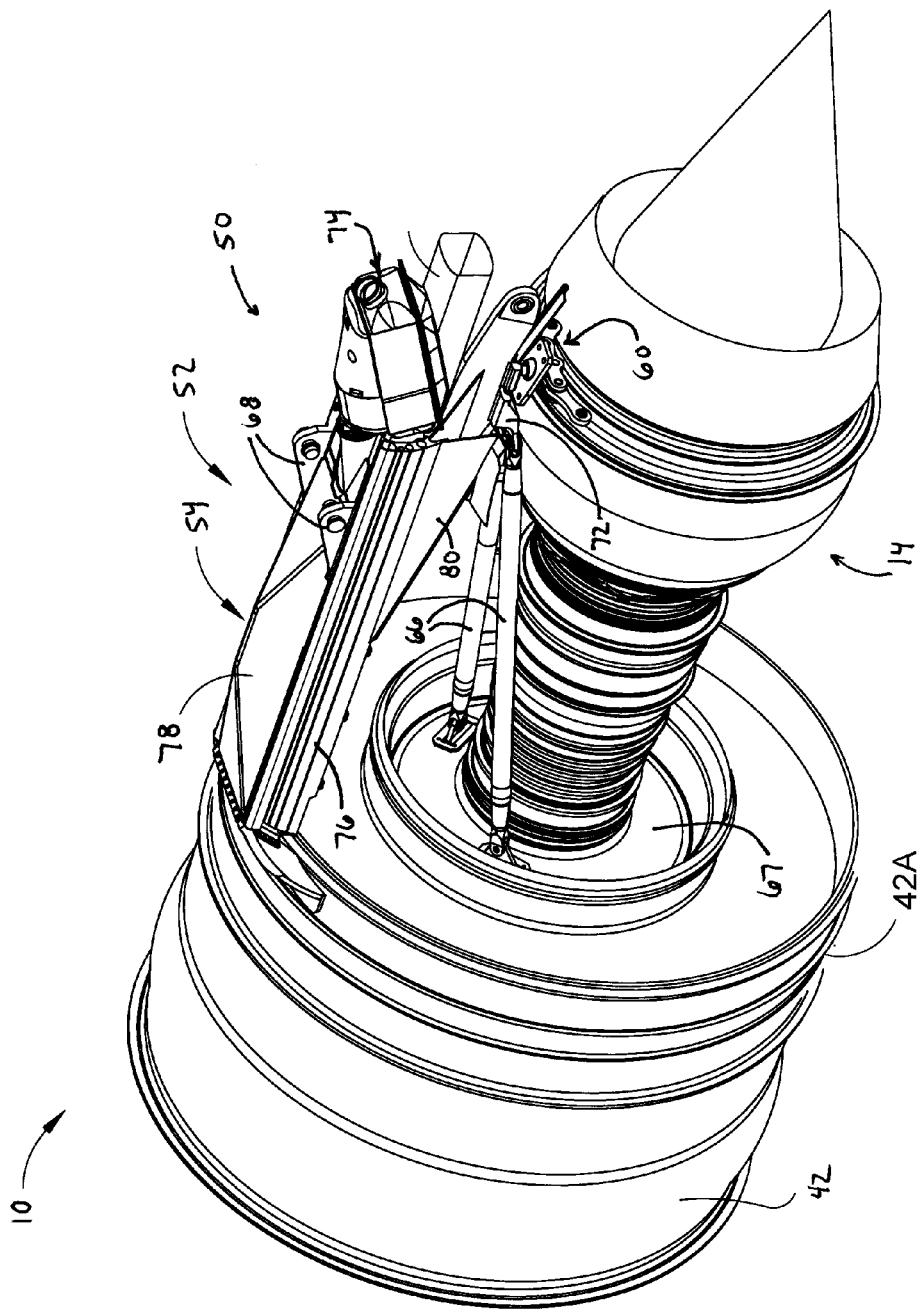
Figure 6:
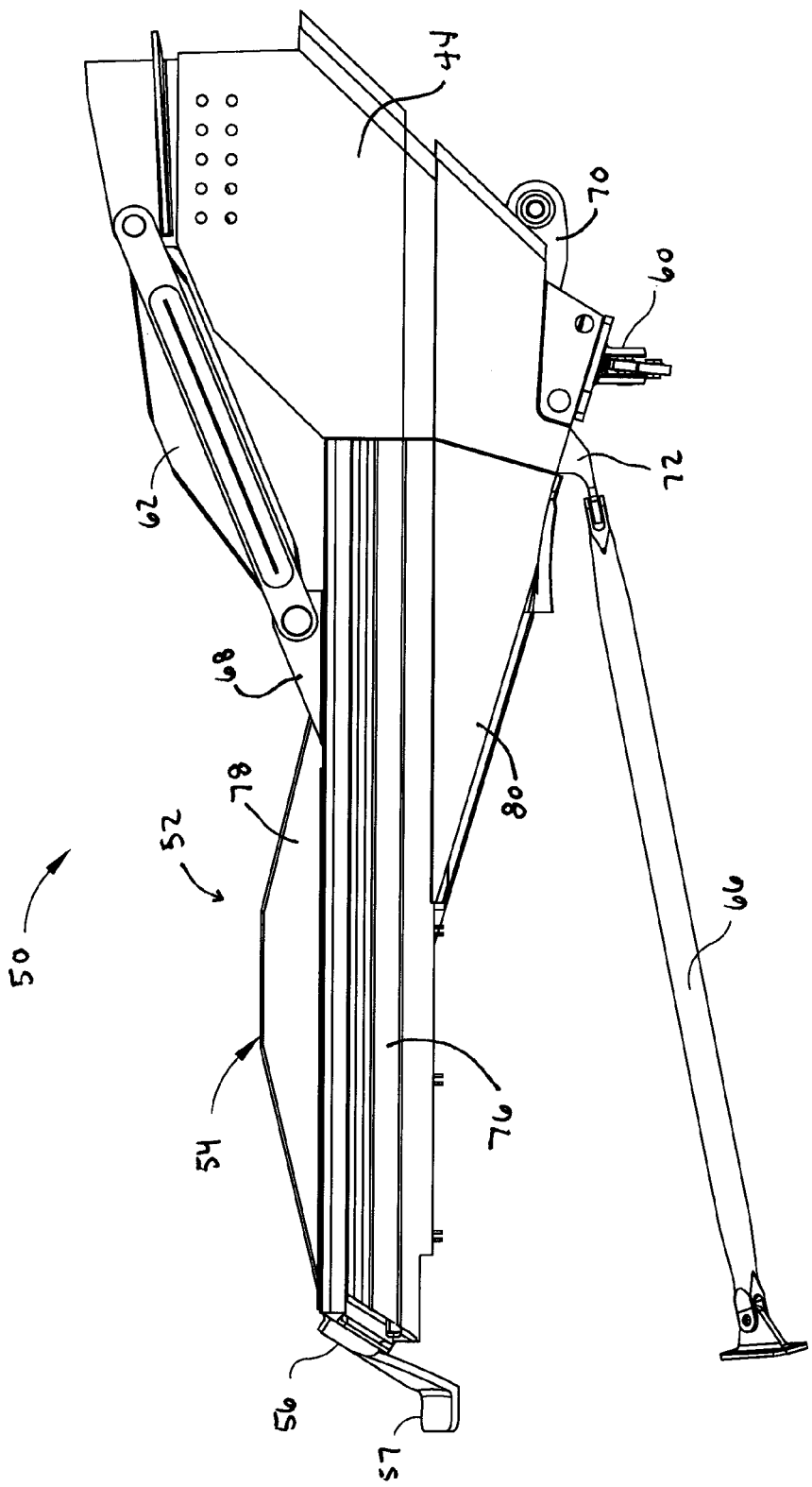
FIG. 6 is a side view showing the mounting system of FIG. 2 attached to the aircraft wing support structure, but isolated from the engine.
Figure 7:
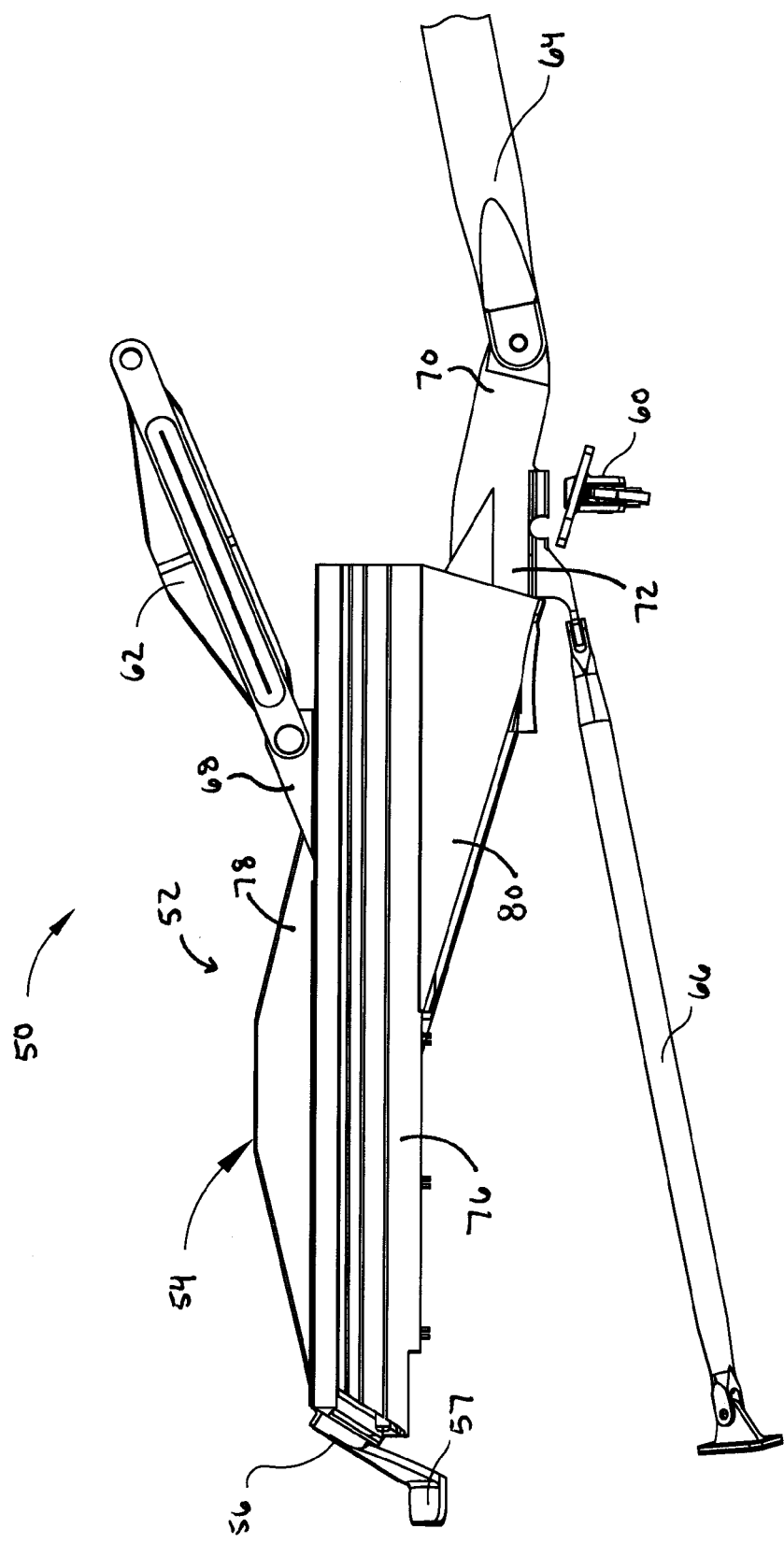
FIG. 7 is a side view of the mounting system of FIG. 6, but shown further isolated from the aircraft wing support structure.

Further details and perspectives of the linkage mechanism and its components can be understood from further reference to FIGS. 3 through 7. In FIG. 3, the aircraft wing support structure 44 is omitted to provide a better view of the lower section 72 of the system 50. In FIG. 5, the upper and lower links 62 and 64 are removed to provide a better view of the bar members 68 and 70 to which they are connected. FIG. 5 also illustrates the capability of accommodating other engine components within the system 50, in this case, an optional precooler unit 74. FIGS. 6 and 7 show the mounting system 50 isolated from the engine 10, and FIG. 7 shows the system 50 with the aircraft wing support structure 44 omitted.

The linkage mechanism preferably provides a connection between the engine 10 and aircraft wing support structure 44 (or other suitable support structure) that significantly reduces backbone bending/deflection within the core engine 14 that would otherwise result from thrust and inlet loads of the type previously described in reference to FIG. 1. In particularly preferred embodiments, backbone bending/deflection may potentially be reduced to negligible levels or even zero.

Figure 8:
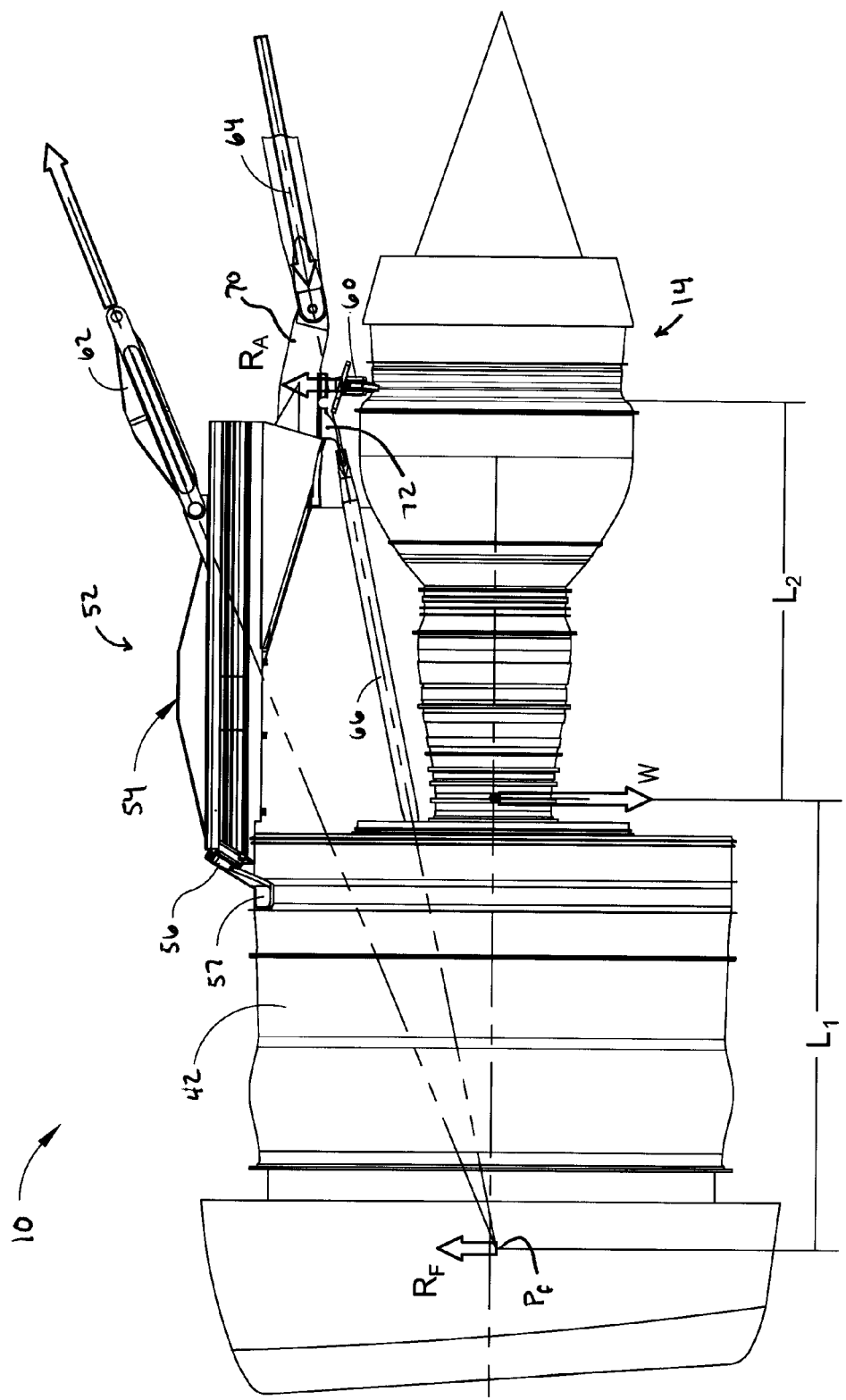
FIGS. 8 through 11 represent different loading conditions imposed on the engine and mounting system of FIG. 2.
Figure 9:
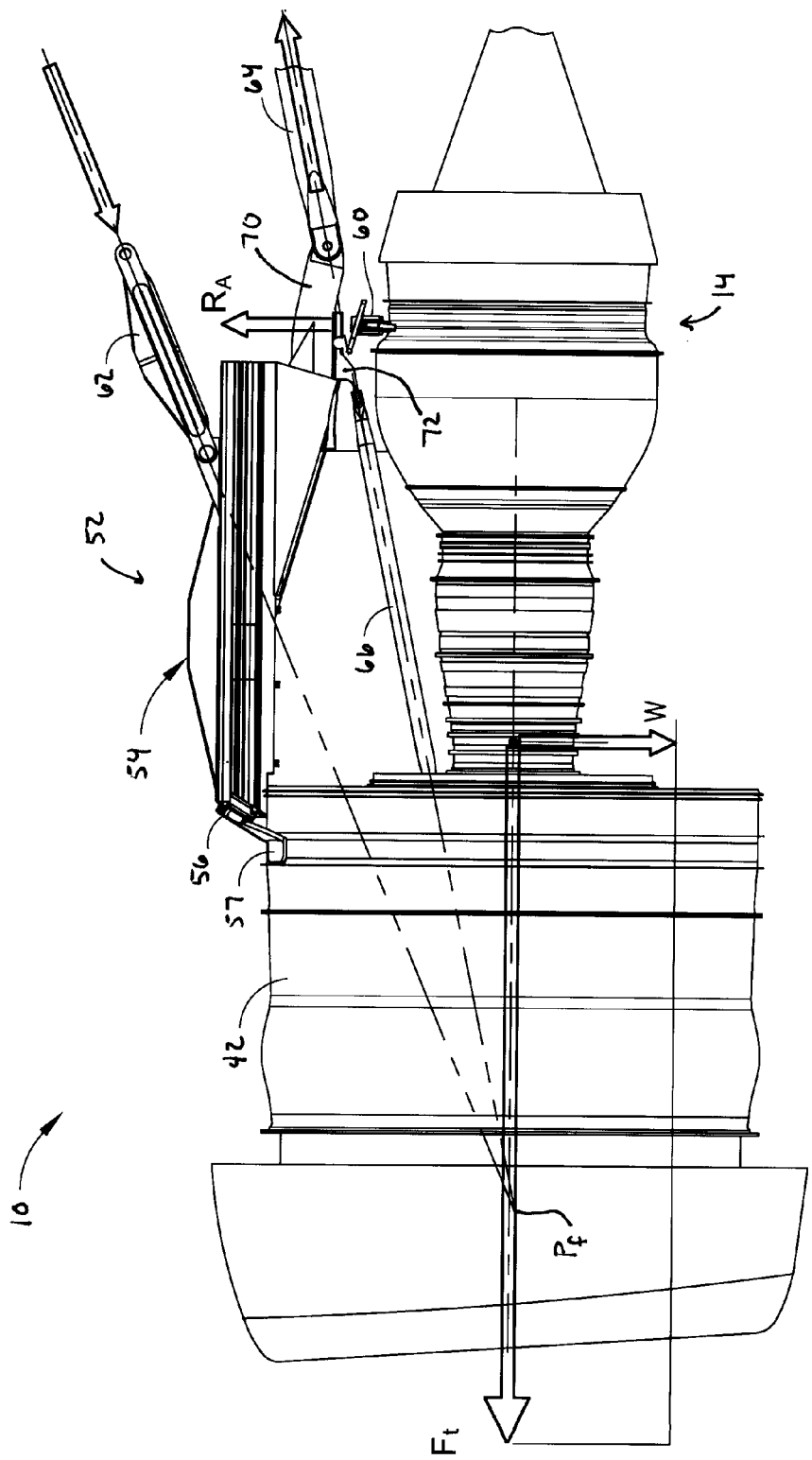

As represented in FIGS. 2, 3 and 8 through 11, the vector of a force (or forces within the same plane) transmitted through the upper links 62 and the vector of a force (or forces) transmitted through the lower and thrust links 64 and 66 (which are shown as substantially aligned for the purpose of transmitting this force approximately within the same plane) intersect at a focal point, $P_f$. As evident from FIGS. 2, 3 and 8 through 11, the focal point is located slightly below the engine centerline 40 near the fan inlet assembly 12A. The capability of the system 50 to potentially reduce backbone bending/deflection to low values or zero can be further understood from reference to FIGS. 8 through 11. FIG. 8 diagrammatically represents relative force vectors that exist solely as a result of the weight, W, of the engine 10 (no engine operation), and indicates that the engine weight is shared between the links 62 and 64 and the aft engine mount 60, as indicated by the forward and aft reactions, $R_F$ and $R_A$, respectively, which are axially spaced distances $L_1$ and $L_2$ from the center of gravity of the engine 10. FIG. 9 diagrammatically represents conditions that exist during take-off, during which the links 62 and 64 and aft engine mount 60 are subjected to additional forces resulting from engine thrust, $F_t$.

Figure 10:
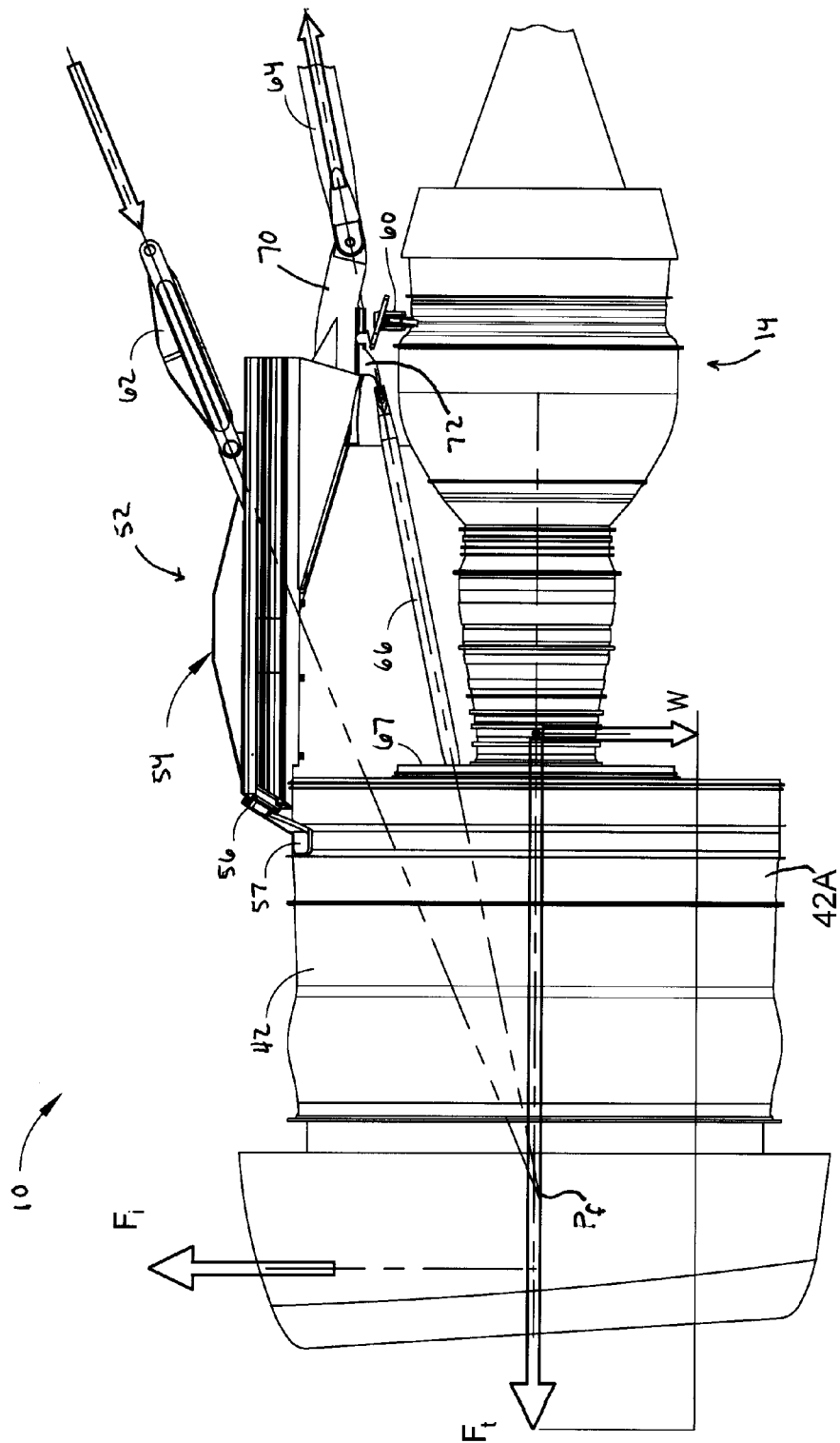

In FIG. 10, an inlet load, $F_i$, is indicated as being additionally present as a result of the aircraft being in a climb, during which the nacelle 12 is subjected to upward aerodynamic loading as a result of the centerline 40 of the engine 10 being pitched upward relative to the direction of approaching airflow. Notably, FIG. 10 represents the vectors for engine thrust and inlet loads, $F_t$ and $F_i$, as imposing load moments in opposite directions around the focal point, $P_f$, of the links 62 and 64, with the result that their moments can cancel each other out if their distances relative to the focal point are appropriate for their respective magnitudes of $F_t$ and $F_i$. In the absence of a bending moment induced in the engine 10 by the inlet load, $F_i$, the backbone of the core engine 14 will not be subjected to bending or deflection. Notably, relatively little if any force is applied through the aft engine mount 60 under the conditions represented in FIG. 10. Consequently, the location of the focal point below the engine centerline 40 and slightly behind the intersection of the vectors for the engine thrust and inlet loads, $F_t$ and $F_i$, is a preferred aspect of the invention in order to significantly reduce bending and deflection of the backbone of the core engine 14. However, it is also within the scope of the invention that the location of the focal point could be at or even above the centerline 40. Generally, it is believe that suitable results can be achieved if the focal point is located a distance of not more than 15% of the inlet diameter (as defined by the inner diameter of the fan case 42 within the inlet assembly 12A) from the engine centerline 40. In addition, the focal point is preferably located in close proximity to the intersection of the engine thrust and inlet load vectors, $F_t$ and $F_i$, so as to be located within the fan inlet assembly 12A of the engine 10. However, suitable results are believed to be achievable if the focal point is located aft of the intersection a distance of not more than 75% of the distance between the intersection and the high pressure compressor forward flange station 67, as also represented in FIG. 10.

Figure 11:
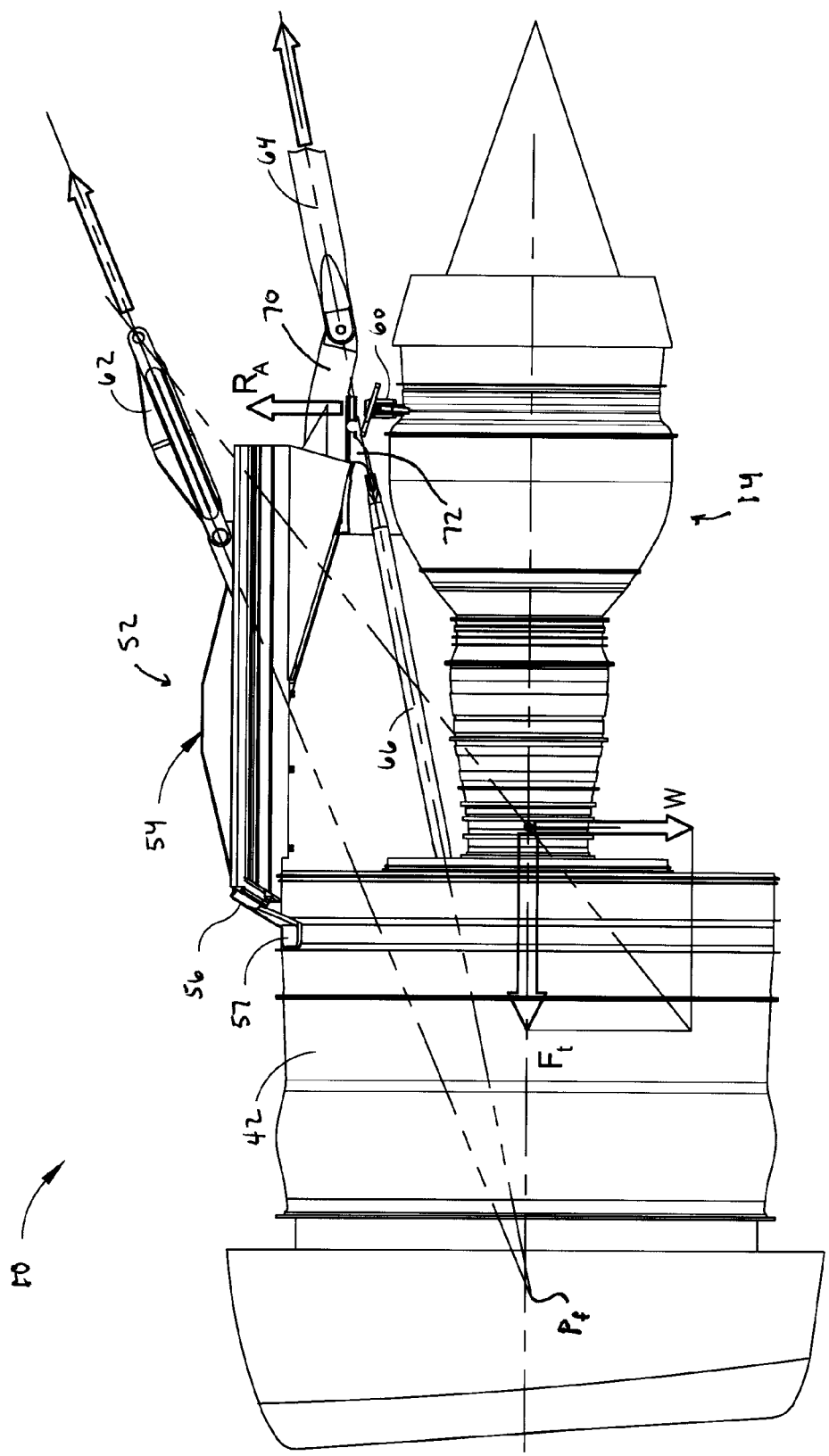

Finally, FIG. 11 diagrammatically represents conditions that exist during cruising, during which the links 62 and 64 and aft engine mount 60 are subjected to forces resulting from the engine weight, W, and a lower engine thrust, $F_t$, but in which case an inlet load is essentially absent. From FIGS. 8 through 11, it should be evident that the mounting system 50 can be designed so that the role of the aft engine mount 60 that couples the aft support frame 46 of the core engine 14 to the aircraft wing support structure 44 can, under appropriate circumstances, be limited to supporting a portion of the weight of the engine 10 (e.g., FIG. 8) and absorbing some share of gust loads, etc., as is typically encountered in flight.

From the foregoing, it should be appreciated that the location of the focal point, $P_f$, below the engine centerline 40 and slightly behind the intersection of the vectors for the engine thrust and inlet loads, $F_t$ and $F_i$, can be achieved with combinations and configurations of links and mounting locations that differ from what is represented in the Figures, and such other combinations and configurations are within the scope of the invention. Suitable alternatives can be readily ascertained by utilizing applied mathematics vector analysis to derive moments, as known in the art.

Figure 12:
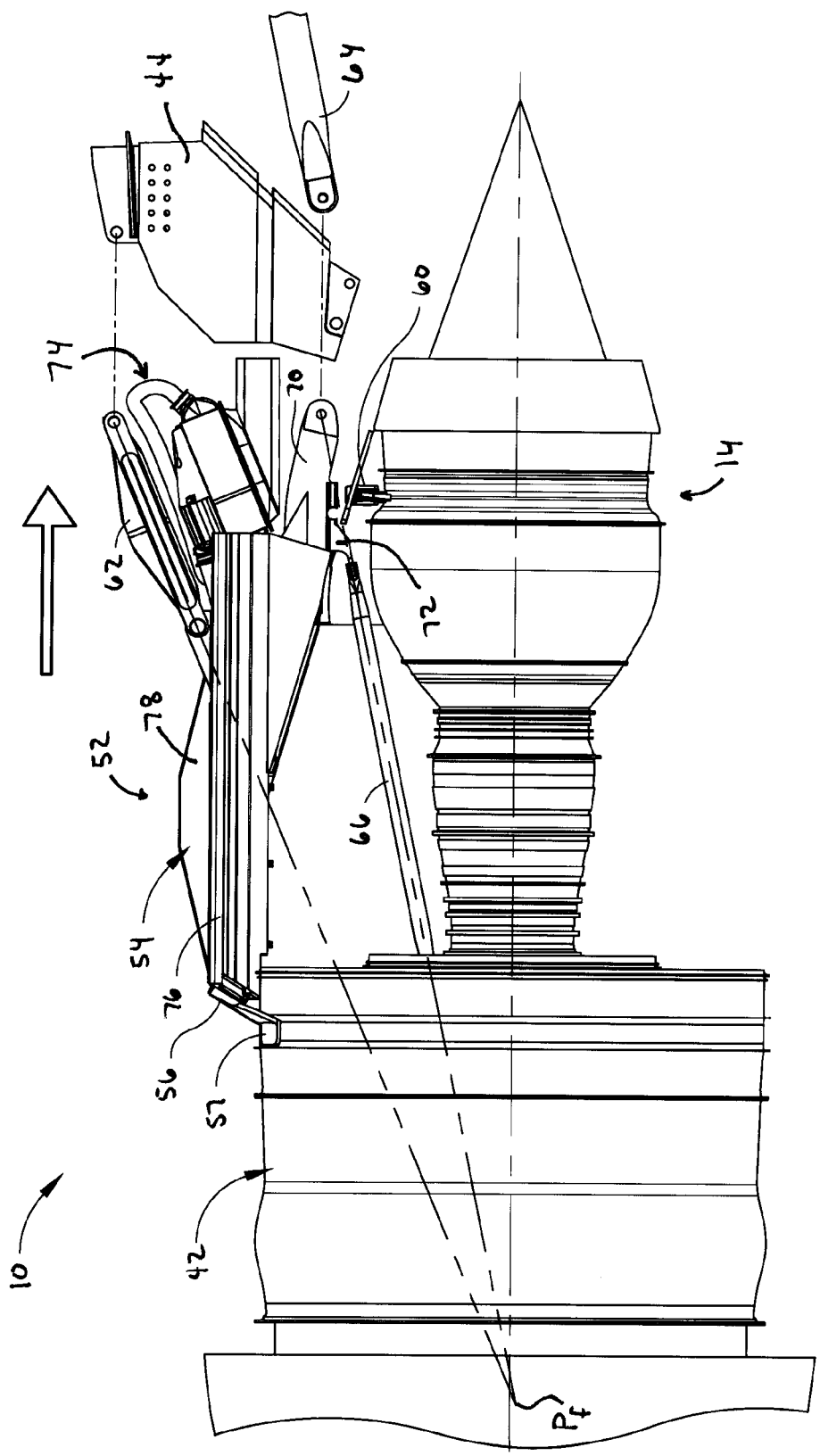
FIG. 12 schematically represents the installation of the engine of FIG. 2 and its mounting system onto an aircraft wing support structure.

FIG. 12 represents a process by which the engine 10 equipped with the mounting system 50 can be mounted to an appropriate support structure 44 of an aircraft wing, during which the entire engine 10 and its mounting system 50 are aligned with the corresponding attachment structures of the aircraft. The upper links 62 are represented as being assembled with their respective bar members 68, whereas the lower link 64 has been pre-assembled with appropriate support structure (not shown) on the aircraft wing and the aft engine mount 60 has been pre-assembled with the aft support frame 46 of the core engine 14. Thereafter, the engine 10 is moved aftward to allow connection of the upper links 62 to the wing support structure 44, connection of the lower link 64 to the bar member 70, and connection of the aft engine mount 60 to the wing support structure 44.

Figure 13:
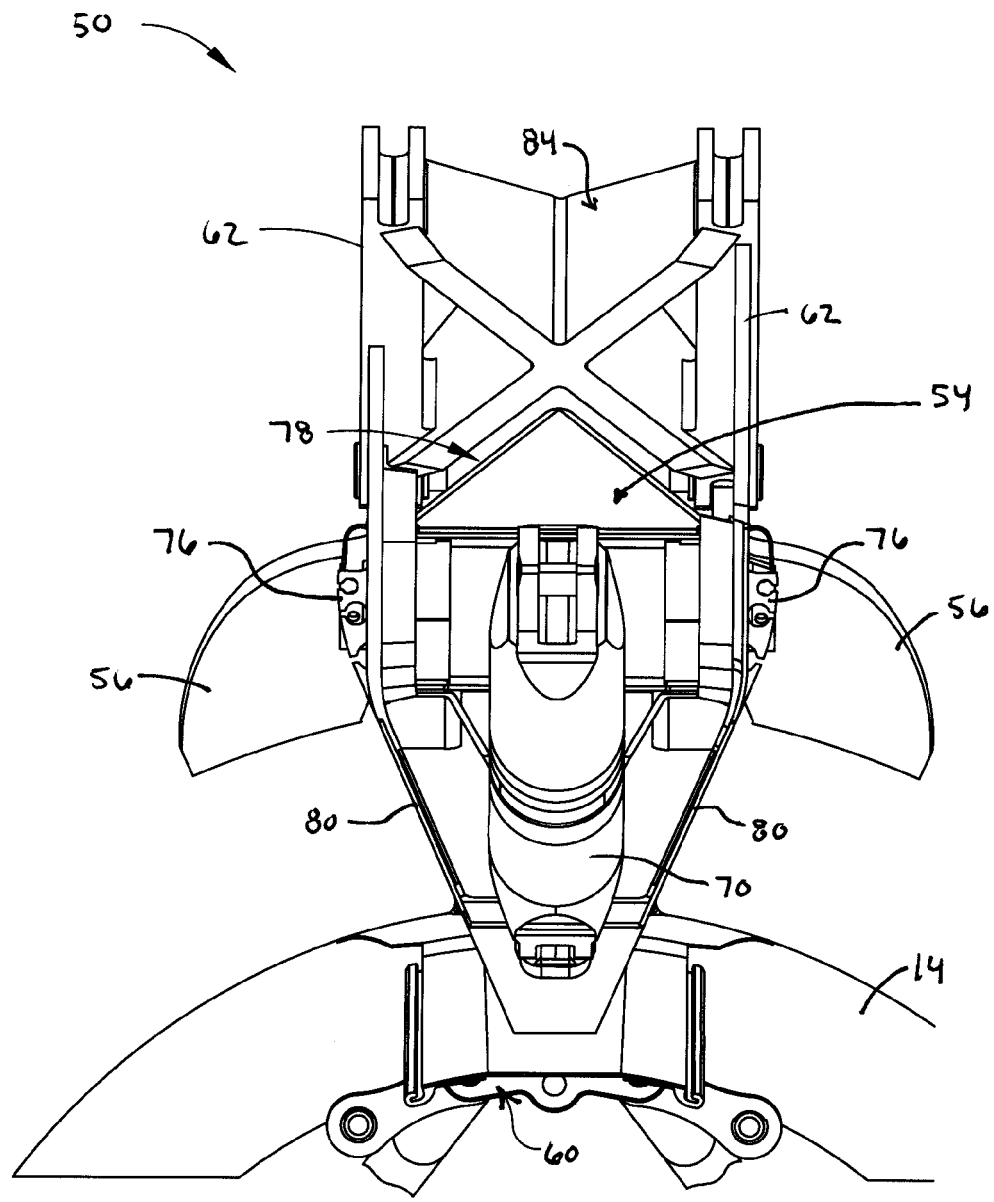
FIGS. 13 through 17 represent various views illustrating selected structures associated with a forward section of the mounting system of FIG. 2.
Figure 14:
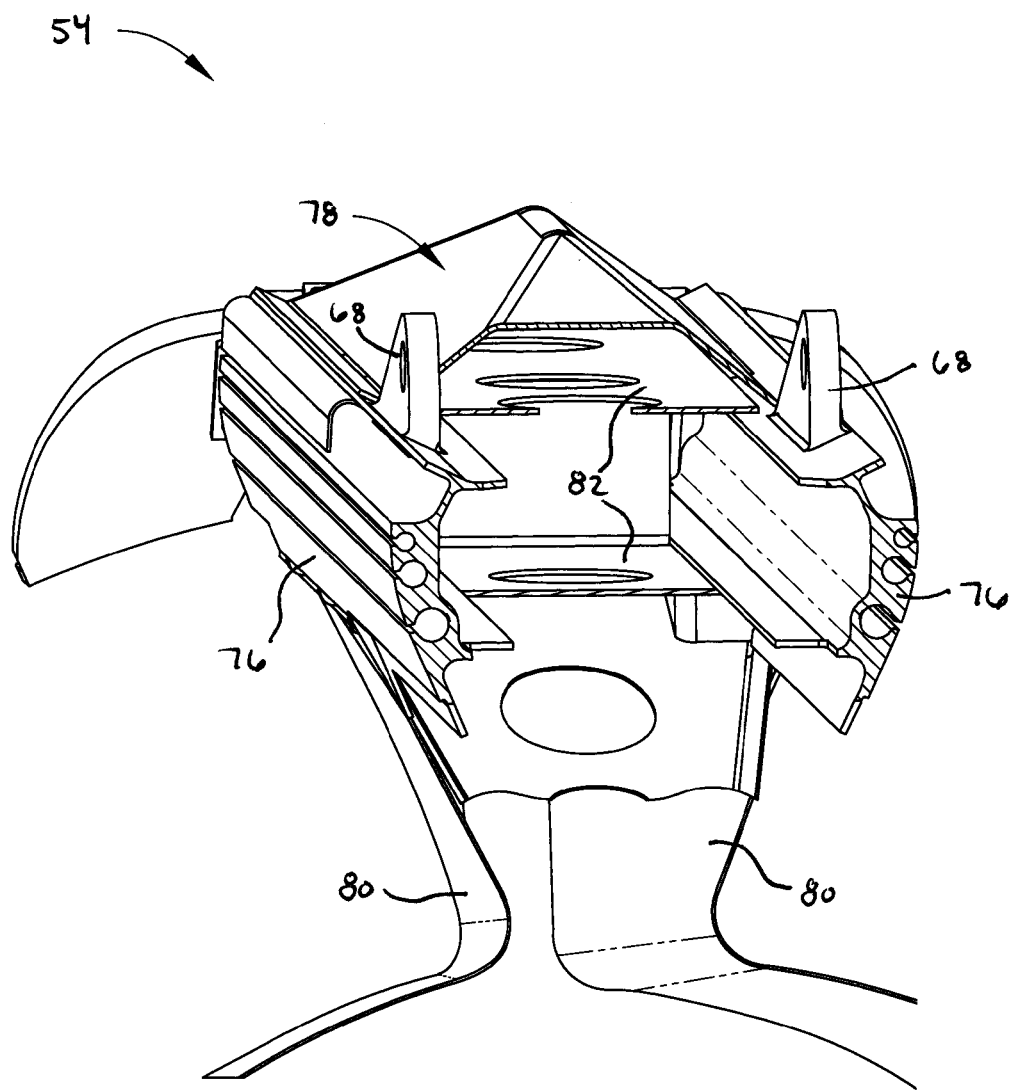
Figure 15:
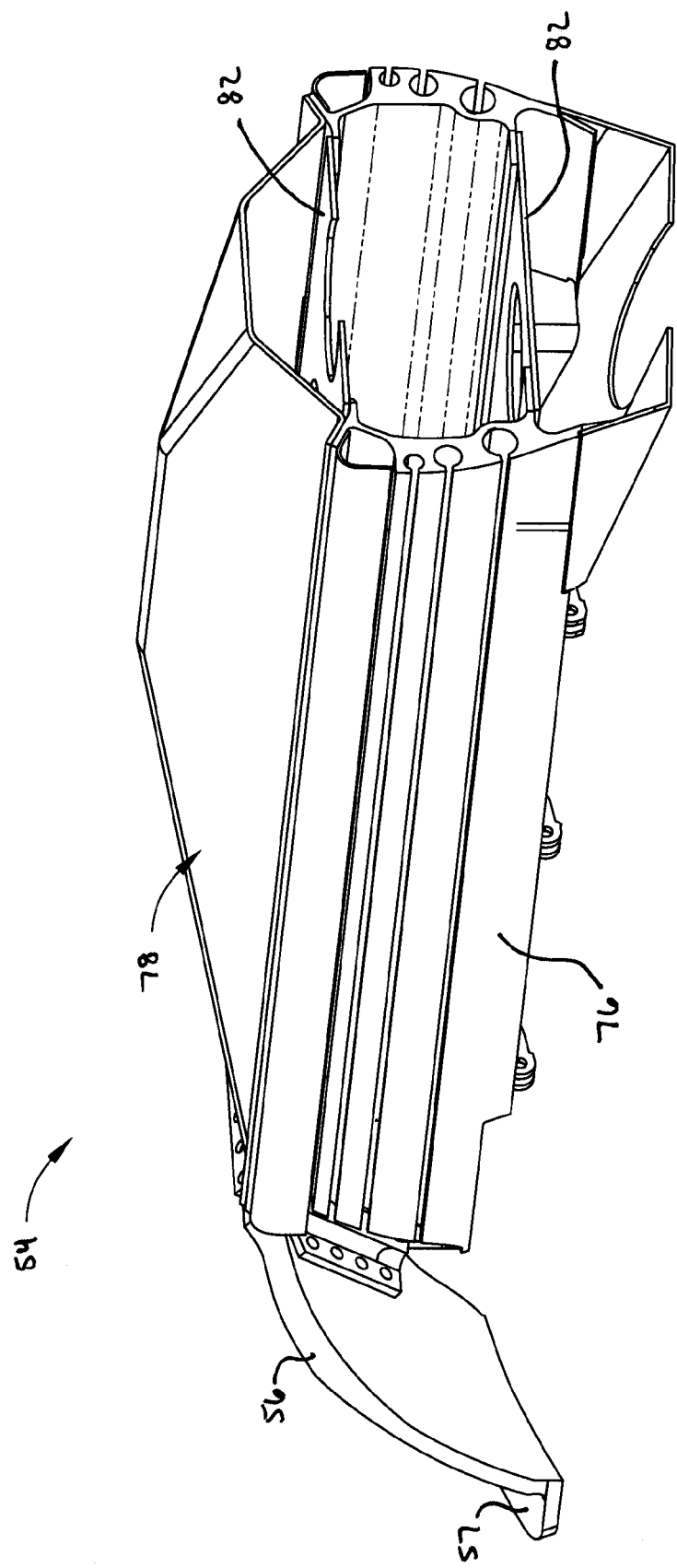
Figure 16:
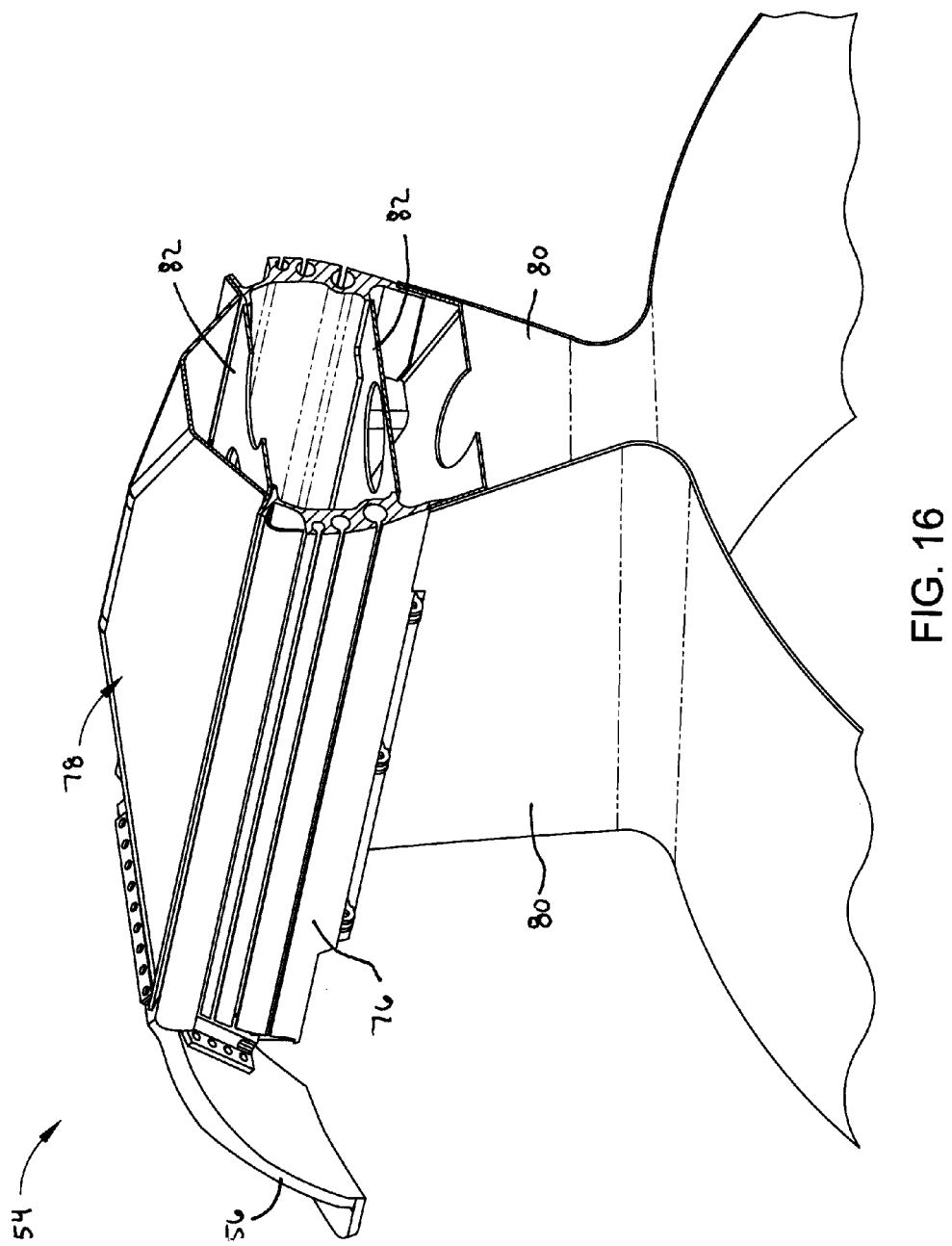
Figure 17:
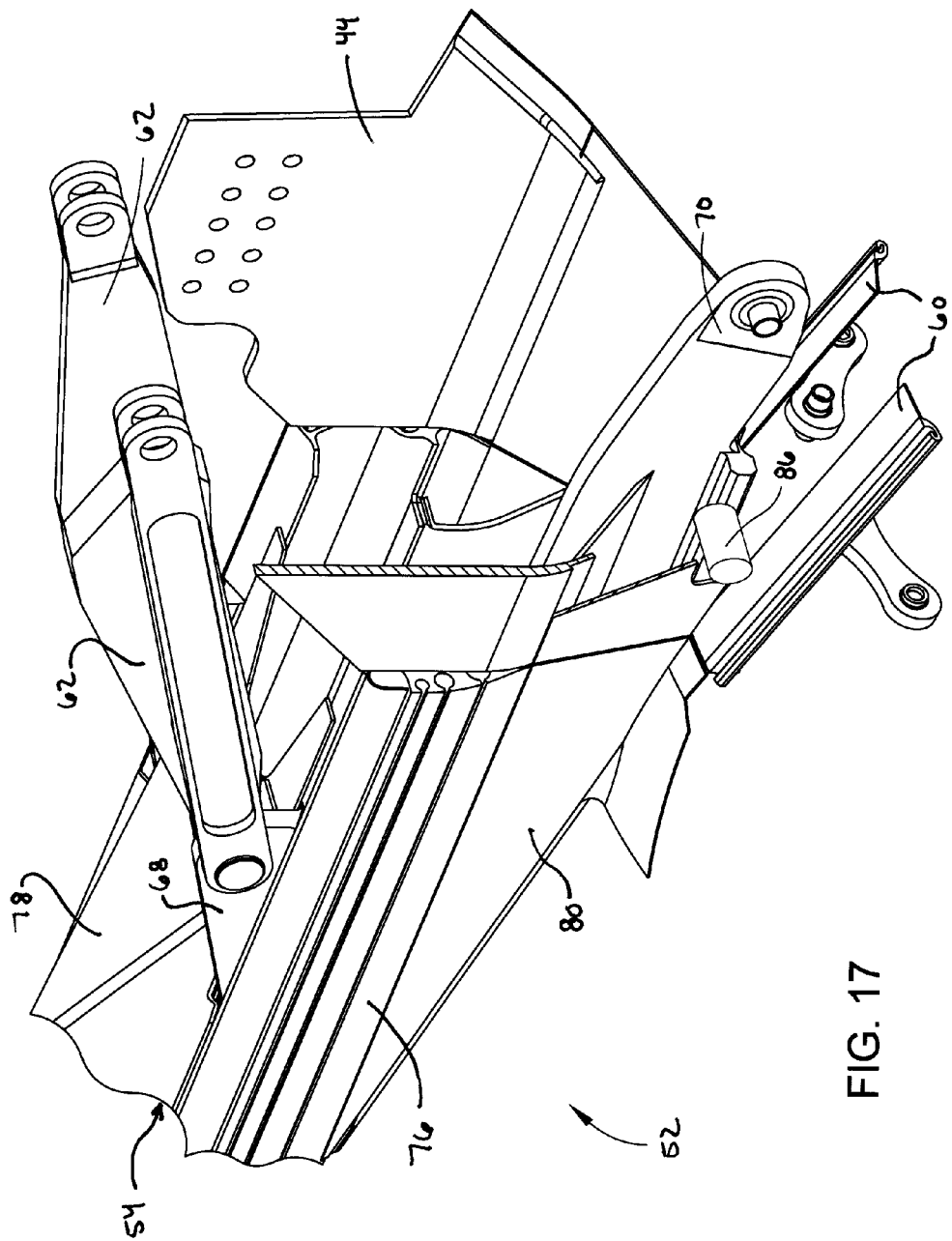

Finally, FIGS. 13 through 17 represent additional details relating to the integrated structure 54 within the forward section 52 of the mounting system 50. In the embodiment represented in FIGS. 13 through 17, the integrated structure 54 is shown as being configured to promote torsional stiffness, while also being narrow and tapered to promote the aerodynamic performance of the mounting system 50. FIG. 13 is a view looking in the forward direction toward the mounting system 50, from which it can be seen that the integrated structure 54 has a tapered structure 76 and a pyramidal-shaped upper structure 78 located forward of the upper links 62. A tapered cowl structure 80 extends downwardly from the tapered structure 76, providing the forward section 52 of the mounting system 50 with an aerodynamic exterior shape. As more readily seen in FIGS. 14 through 16, the torsional stiffness of the integrated structure 54 is promoted by internal webs 82 that, in combination with the tapered and pyramidal shapes of the structures 76 and 78, provide a hexagonal cross-section capable of promoting the torsional stiffness of the integrated structure 54. As seen in FIG. 13, the upper links 62 are represented as being interconnected with an X-shaped web 84 that promotes the torsional stiffness of the links 62. In FIG. 17, a portion of the forward section 52 is represented as well as an adjacent portion of the wing support structure 44 to which the forward section 52 is coupled via the upper links 62 (whose connections to the support structure 44 are not shown). FIG. 17 shows the integrated structure 54 as further comprising a lug 86 (preferably one of two) to which the wing support structure 44 can be coupled to provide a waiting fail-safe capability, as may often be provided with aircraft engine mounting systems to provide structural redundancy and provide a means to deal with unlikely but designed-for extreme loads.

While the invention has been described in terms of a specific embodiment, it is apparent that other forms could be adopted by one skilled in the art. For example, the physical configuration of the mounting system 50 and its components could differ from that shown, and various materials and processes could be used to construct the system 50 and its components. Therefore, the scope of the invention is to be limited only by the following claims.

The invention claimed is:

1. A system for mounting an engine to an engine support structure of an aircraft, the engine being a turbomachine having an inlet diameter at an inlet thereof, the system comprising a rigid structure and a linkage mechanism having at least first and second links that are each pivotally connected to the rigid structure and adapted to be pivotally connected to the engine support structure, the first and second links being configured to define a focal point thereof at a location that is a distance of not more than 15% of the inlet diameter from a centerline of the engine and aft of a vector of an inlet load to which the engine is subjected when the aircraft is in a climb maneuver, the location of the focal point causing a moment of a thrust load of the engine and a moment of the inlet load to oppose each other and thereby reduce backbone bending of the engine during the climb maneuver.

2. The system according to claim 1, wherein the focal point is located below the centerline of the engine and within a fan inlet assembly of the engine that defines the inlet of the engine and the inlet diameter thereof.

3. The system according to claim 1, wherein the first link is pivotally coupled to the rigid structure above the second link and adapted to be pivotally connected to the engine support structure of the aircraft the second link.

4. The system according to claim 3, wherein the second link is a thrust link, the linkage mechanism further comprising a third link that is aligned with the thrust link, is pivotally coupled to the rigid structure below the first link, and is adapted to be pivotally connected to the engine support structure below the first link.

5. The system according to claim 1, wherein the engine is a turbofan engine, and the system further comprises means for coupling the rigid structure to a fan case of the turbofan engine.

6. The system according to claim 5, further comprising means for coupling the second link to a core engine of the turbofan engine.

7. The system according to claim 5, further comprising means for coupling the core engine to the engine support structure of the aircraft.

8. The system according to claim 7, wherein the coupling means supports a portion of the weight of the turbofan engine.

9. The system according to claim 8, wherein the coupling means is not subjected to a load greater than the portion of the weight of the turbofan engine during the climb maneuver.

10. The system according to claim 1, wherein the rigid structure has a downwardly-tapering exterior shape.

11. The system according to claim 1, wherein the rigid structure has a hexagonal cross-section configured to promote rigidity of the rigid structure.

12. The system according to claim 1, wherein the system is mounted to the engine and to the engine support structure of the aircraft, the focal point of the first and second links is located below the centerline of the engine and aft of the vector of the inlet load to which the engine is subjected when the aircraft is in the climb maneuver so that the moments of the thrust and inlet loads oppose each other.

13. The system according to claim 12, wherein the engine support structure of the aircraft is mounted to a wing of the aircraft.

14. The system according to claim 13, wherein the engine is a turbofan engine comprising a nacelle and a core engine, and the focal point is located at a fan inlet of the nacelle.

15. The system according to claim 14, wherein the first link is pivotally coupled to the rigid structure above the second link and pivotally connected to the engine support structure of the aircraft above the second link, the second link is a thrust link that is coupled to the core engine of the turbofan engine, and the linkage mechanism further comprises a third link that is aligned with the thrust link, is pivotally coupled to the rigid structure below the first link, and is pivotally connected to the engine support structure below the first link.

16. The system according to claim 14, further comprising means for coupling the rigid structure to a fan case of the turbofan engine.

17. The system according to claim 14, further comprising means for directly coupling the core engine to the engine support structure of the aircraft.

18. A method of mounting an engine to a engine support structure of an aircraft, the engine being a turbomachine having an inlet diameter at an inlet thereof, the method using a system comprising a rigid structure and a linkage mechanism having at least first and second links that are each pivotally connected to the rigid structure and adapted to be pivotally connected to the engine support structure, the method comprising coupling the system to the engine and to the engine support structure of the aircraft so that the first and second links are pivotally connected to the rigid structure, the first link is pivotally connected to the engine support structure of the aircraft, the second link is pivotally connected to the engine, and the first and second links to define a focal point thereof at a location that is a distance of not more than 15% of the inlet diameter from a centerline of the engine and aft of a vector of an inlet load to which the engine is subjected when the aircraft is in a climb maneuver, the location of the focal point causing a moment of a thrust load of the engine and a moment of the inlet load to oppose each other and thereby reduce backbone bending of the engine during the climb maneuver.

19. The method according to claim 18, further comprising providing a third link that is aligned with the second link, is pivotally coupled to the rigid structure below the first link, and is pivotally connected to the engine support structure below the first link.

20. The method according to claim 18, wherein the engine is a turbofan engine and the method further comprises:
   coupling the rigid structure to a fan case of the turbofan engine;
   coupling the second link to a core engine of the turbofan engine; and
   directly coupling the core engine to the engine support structure of the aircraft.

* * * * *